United States Patent [19]
Putman et al.

[11] Patent Number: 5,126,641
[45] Date of Patent: Jun. 30, 1992

[54] BIDIRECTIONAL VARIABLE RELUCTANCE ACTUATOR AND SYSTEM FOR ACTIVE ATTENUATION OF VIBRATION AND STRUCTURE BORNE NOISE UTILIZING SAME

[75] Inventors: Thomas H. Putman, Penn Hills Township, Allegheny County; Dexter V. Wright, Pittsburgh, both of Pa.

[73] Assignee: Westinghouse Electric Corp., Pittsburgh, Pa.

[21] Appl. No.: 666,775

[22] Filed: Mar. 8, 1991

[51] Int. Cl.$^5$ .................................. H02K 33/00
[52] U.S. Cl. ........................... 318/128; 318/127
[58] Field of Search .............. 310/15, 17, 19, 51; 318/114, 126, 127, 128; 335/266

[56] References Cited

U.S. PATENT DOCUMENTS

| | | | |
|---|---|---|---|
| 3,800,555 | 4/1974 | Arneson | 64/1 V |
| 3,874,818 | 4/1975 | Saunders et al. | 416/144 |
| 3,988,073 | 10/1976 | Eastman et al. | 416/145 |
| 4,097,833 | 6/1978 | Myers | 335/261 |
| 4,237,703 | 12/1980 | Wahl, Jr. | 64/28 M |
| 4,282,501 | 8/1981 | Myers | 335/258 |
| 4,406,642 | 9/1983 | McNall | 464/180 |
| 4,600,863 | 7/1986 | Chaplin et al. | 318/114 |
| 4,656,400 | 4/1987 | Pailthorp et al. | 318/135 |
| 4,686,404 | 8/1987 | Nakazeki et al. | 310/90.5 |
| 4,697,128 | 9/1987 | Matsushita et al. | 318/607 |
| 4,808,892 | 2/1989 | Dreibelbis | 318/135 |
| 4,947,067 | 8/1990 | Habermann et al. | 310/51 |
| 4,963,804 | 10/1990 | Geiger | 318/416 |

*Primary Examiner*—Steven L. Stephan
*Assistant Examiner*—Judson H. Jones

[57] ABSTRACT

A bidirectional variable reluctance linear actuator and force control system by which one or more bidirectional linear actuators can be operated to produce a linear relationship between the net force on the armature structure and an applied flux linkage variation signal, as well as an actuator system by which the transmission of vibration through a structure can be blocked by applying forces and/or moments to the structure so as to cancel out its vibratory velocity. An adaptive control system, which is synchronized to machine speed, is able to determine the proper forces that will cancel the vibration of the structure and automatically null out each harmonic of the structure vibration, and cancels the vibration in up to six degrees of freedom of structural motion. The system can provide active attenuation system with a variety of noise sources and transmission paths, i.e., radial (lateral), axial, and torsional, including those associated with propeller shafts, turbine generator sets, pumps, compressors, and other machinery.

44 Claims, 11 Drawing Sheets

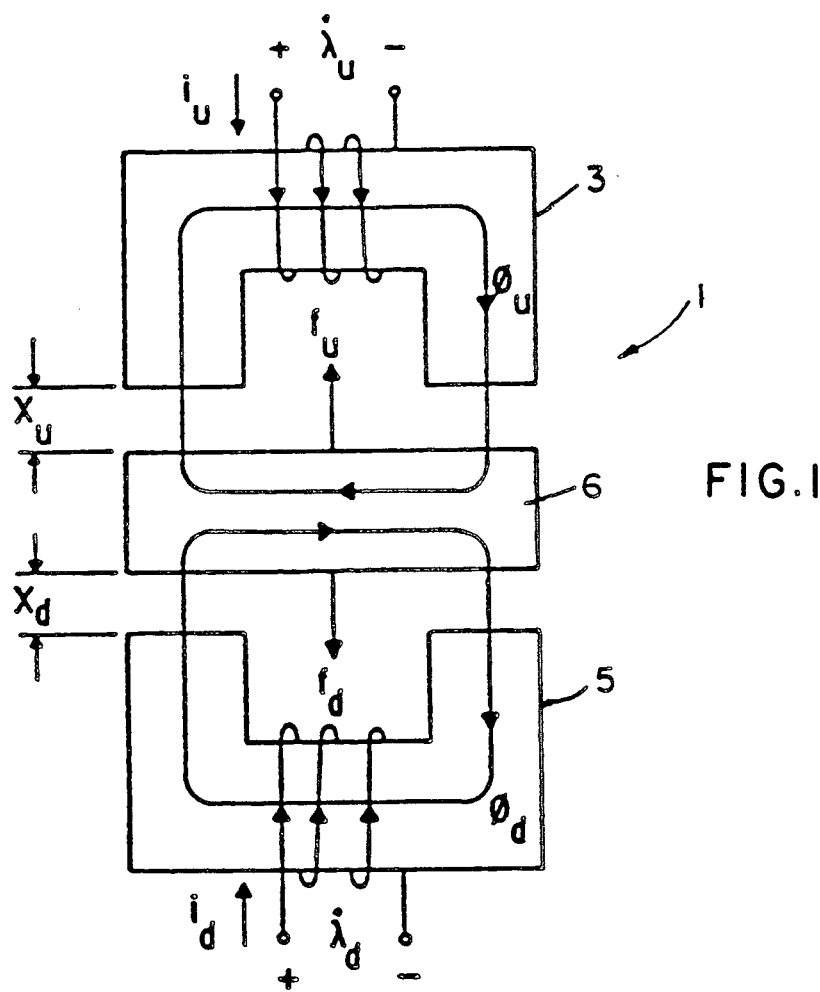
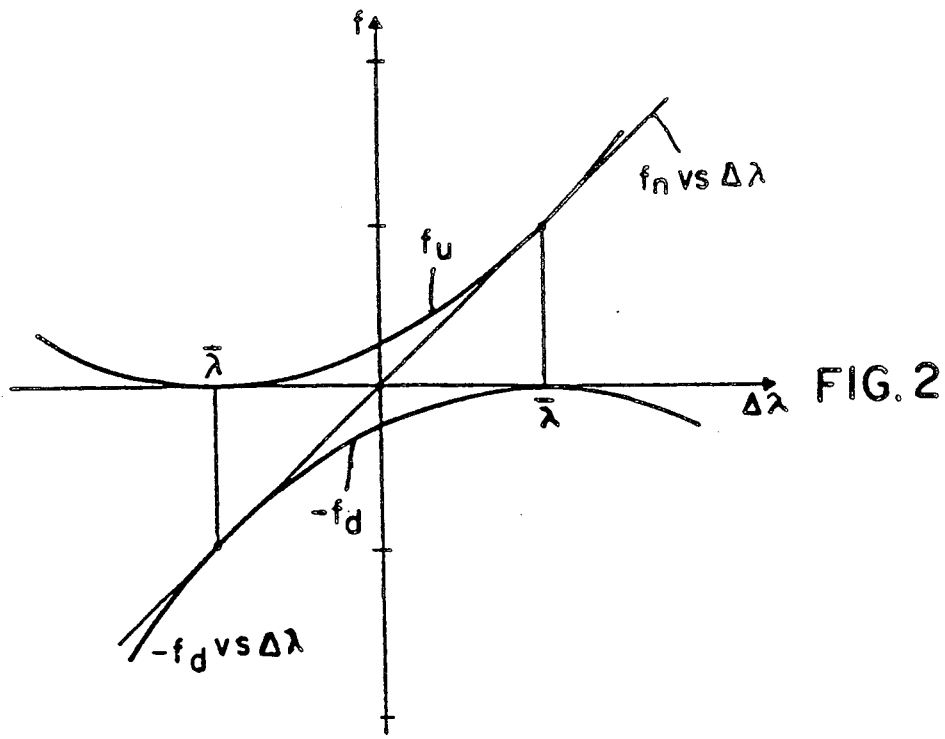

BIDIRECTIONAL VARIABLE RELUCTANCE ACTUATOR AND SYSTEM FOR ACTIVE ATTENUATION OF VIBRATION AND STRUCTURE BORNE NOISE UTILIZING SAME

BACKGROUND OF THE INVENTION

1. Field of the Invention

The present invention relates to variable reluctance actuators, particularly those of the type utilized to apply a controlled force between two points for active vibration control. Furthermore, the invention relates to control systems by which such variable reluctance actuators can be operated for attenuation and damping of vibration and structure borne noise.

2. Related Art

While variable reluctance force actuators normally produce force in only one direction (i.e., that acting to reduce the air gap between the armature and the electromagnet) and are very non linear, a number of patents disclose the use of two variable reluctance actuators in conjunction with each other to produce a bidirectional actuator. Likewise, it is known to utilize force varying characteristics of tapered pole pieces together with a variable area overlap between the armature and pole piece of the electromagnet to obtain a linear behavior. Examples of such bidirectional linear actuators can be found in U.S. Pat. Nos. 3,312,842 and 4,282,501.

Another example of a variable reluctance linear actuator can be found in U.S. Pat. No. 4,656,400, wherein a Hall effect sensor signal representative of flux density in the magnetic circuit of the actuator is utilized to control the moving element of the actuator. However, the actuator of this patent is not bidirectional, requiring an opposing return force mechanism, such as a spring or fluid pressure mechanism. Such actuators possess inherent deficiencies and lack the versatility to be utilized in a wide range of active sound and vibration attenuation applications.

Of course, the use of oppositely acting pairs of actuators in conjunction with appropriate controls to obtain vibration control is also known (see, for example, U.S. Pat. Nos. 4,686,404 and 4,697,128). These arrangments are in the nature of radial magnetic bearing type devices for rotary shafts. However, no bidirectional variable reluctance actuator with an appropriate control is known which is utilizable for active attenuation of vibration and structure borne noise and which is capable of cancelling up to six degrees of freedom of structure motion through a wide range of different types of paths, not merely those associated with radially directed deviations of a rotary shaft.

SUMMARY OF THE INVENTION

In view of the foregoing, it is a primary object of the present invention to provide a bidirectional linear actuator comprised of two variable reluctance magnetic actuators which will be utilizable for the active attenuation of a wide range of structural vibrations and structure borne noise resulting therefrom.

In keeping with the preceding object, it is a further object of the present invention to provide a force control system by which a bidirectional linear actuator can be operated to produce a linear relationship between the net force on the armature structure and an applied flux linkage variation signal.

Another primary object of the present invention is to provide an actuator system by which the transmission of vibration through a structure can be blocked by applying forces and/or moments to the structure so as to cancel out its vibratory velocity.

In connection with the preceding object, it is a more specific object of the present invention to provide an adaptive control system which is synchronized to machine speed, is able to determine the proper forces that will cancel the vibration of the structure and automatically null out each harmonic of the structure vibration, and cancels the vibration in up to six degrees of freedom of structural motion.

A still further object of the present invention is to provide an active attenuation system that can be utilized with a variety of noise sources and transmission paths, i.e., radial (lateral), axial, and torsional, including those associated with propeller shafts, turbine generator sets, pumps, compressors, and other machinery.

These and other objects of the present invention are obtained, in accordance with preferred embodiments of the present application, by the provision of a bidirectional linear actuator which is comprised of two variable reluctance magnetic actuators of which the electromagnets are connected together through a common structural element, as are the armatures, if more than one is utilized while, in the case of a single armature, the flux produced by the electromagnets traverses the armature core in opposite directions. Furthermore, each electromagnet is equipped with a flux linkage control system which slaves the flux linkages to a reference signal and which drives its respective electromagnet coil with controlled voltage sources. Additionally, the flux linkage control system is incorporated into a force control system which changes the flux linkages in the electromagnet coils so as to produce a linear relationship between the net force in the armature structure and an applied flux linkage variation signal. The force control system causes the net force in the armature structure to follow a reference force, and with an overall transfer function that is linear with a single time constant delay.

The active attenuation system in accordance with the present invention blocks the transmission of vibrations through a structure by applying forces and/or moments to the structure so as to cancel out its vibratory velocity. In particular, a reaction mass is levitated or floated by magnetic forces, hydrostatic bearings, or guide springs, and at least one force actuator applies forces between the structure and the reaction mass. An adaptive control system determines the proper forces that will cancel the vibration of the structure. The adaptive control system is synchronized to machine speed and determines the harmonic amplitudes of the vibration in real time, and generates sine and cosine harmonic functions for use in automatically nulling out each harmonic of the structure vibration.

More specifically, the bidirectional, variable reluctance linear force actuators of the present invention are utilized as a means to apply a force to the structural member which comprises the vibration transmission path for purposes of blocking transmission of the vibration. For actively controlling longitudinal shaft vibrations, a thrust collar is rigidly attached to the shaft that functions as an armature of the force actuator. For torsional damping or oscillatory torque cancellation with respect to a rotary shaft, these effects are damped or cancelled out by means of an inertia ring which is coupled to the shaft via variable reluctance torque actuators and magnetic bearings.

Radially directed vibrations are treated in a manner analogous to that utilized for canceling axial vibrations. In this case, horizontal and vertical directions are considered separately using a force actuator which is disposed between a bearing housing and a mass that is supported in a frictionless manner for treating forces in a horizontal direction, and with a similar arrangement being used for treating forces acting in a vertical direction Active vibration control with respect to pipe vibration, such as for a steam pipe of a steam turbine, is treated by blocking the vibratory transmission along the pipe by causing the pipe at a given cross-section to stand still. This is achieved by applying suitable forces and moments to that section in all three coordinate directions together with moments along all three coordinate axis. For example, a reaction mass is levitated in free space by a magnetic suspension in order to have as many as six degrees of freedom. Forces are then generated by bidirectional variable reluctance force actuators between the structure to be silenced and the levitated reaction mass.

These and other objects, details, features, and embodiments in accordance with the present invention will become apparent from the following detailed description when viewed in conjunction with the accompanying drawings.

BRIEF DESCRIPTION OF THE DRAWINGS

FIG. 1 is a schematic depiction of a bidirectional variable reluctance actuator in accordance with the present invention;

FIG. 2 is a graphic depiction of how a combination of oppositely directed forces are utilized by the actuator of FIG. 1 to produce a linear net force;

DETAILED DESCRIPTION OF THE PREFERRED EMBODIMENTS

Figure 3:
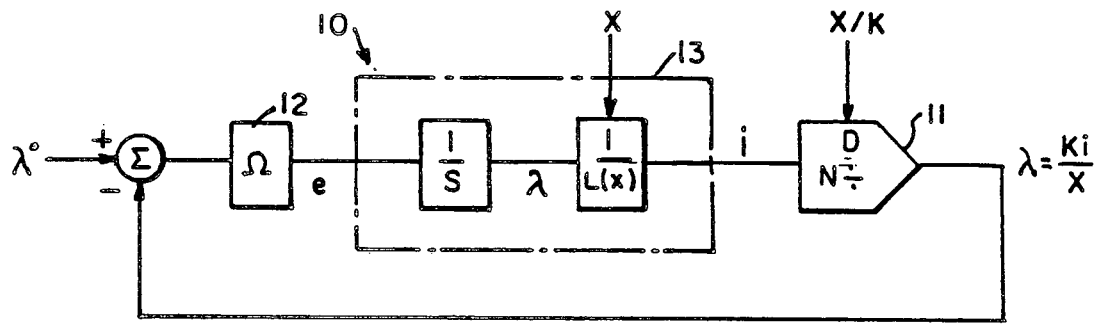
FIG. 3 is a schematic depiction of a flux linkage control system for the actuator of FIG. 1.

A basic approach to blocking of the transmission of vibration along a path from a structural member is to apply a force to the structural member. In the case of the present invention, a bidirectional, variable reluctance force actuator designated generally by the reference numeral 1 in FIG. 1 has been developed for this purpose. The actuator 1 is designed for applying a force to the structural member to cancel out the vibration caused by the machinery forces, and in accordance with the present invention, is comprised of a pair of electromagnets 3, 5 which act in opposite directions upon an armature 6. These components are preferably made of laminated iron to eliminate eddy current effects. The pair of magnets 3, 5 are mechanically connected together by an external structure which is not shown in FIG. 1, and as will become apparent, varies depending on the nature of the structural member and of the forces to be cancelled.

For purposes of the following discussion, the electromagnets 3, 5 will be treated as being vertically oriented so that magnet 3 is the upper electromagnet and magnet 5 is the lower electromagnet, with the subscripts u and d being used to designate the variables associated with the upper and lower magnets, respectively. However, it should be appreciated that, in practice, the electromagnets 3, 5 need not be vertically oriented, and can be horizontally or obliquely oriented as appropriate to oppose the pulsations of the structure upon which the actuator 1 is to act.

From the basic principles of electromagnetic force, it will be recognized that the flux $\phi$ produced by the coil will be a function of the number of turns and the current i flowing through the coil. This flux is responsible for a magnetic force f being produced which always acts in a direction to reduce the air gap x. Furthermore, given the relationship of magnetic force to coil current and air gap, as well as for the self-inductance of a coil and flux linkage as with the coil of an electromagnet, it can be shown that the magnetic actuator force f can be expressed by the following relationship:

$$f = \lambda^2/(2K) \qquad [1]$$

where $\lambda$ is the flux linkage with the coil and K is a constant which equals the product of the self-inductance of the coil and the size of air gap x. The constant K can be measured or calculated.

Because the fluxes $\lambda_u$ and $\lambda_d$ traverse the armature in opposite directions, an armature may be used that is of the same physical size as would be used for a unidirectional, variable reluctance force actuator. Additionally, since equation [1] applies relative to the force $f_u$ produced by electromagnet 3 and the force $f_d$ produced by electromagnet 5, the net force $F_u$ acting upon armature 6 can be expressed as:

$$f_n = f_u - f_d = (\lambda_u^2 - \lambda_d^2)/(2K) \quad [2]$$

Furthermore, if a quiescent operating value of $\lambda_u$ and $\lambda_d$ is defined as $\bar{\lambda}$, and the variation from the quiescent value is $\Delta\lambda$ such that $\Delta\lambda$ is added to $\bar{\lambda}$ to obtain $\lambda_u$ and subtracted from $\bar{\lambda}$ to obtain $\lambda_d$, then:

$$\lambda_u = \bar{\lambda} + \Delta\lambda \quad [2.1]$$

and $$\lambda_d = \bar{\lambda} - \Delta\lambda \quad [2.2]$$

The upward force $f_u$ and the downward force $f_d$ can then be expressed in terms of $\Delta\lambda$ as follows:

$$f_u = (\tfrac{1}{2}K)(\bar{\lambda} + \Delta\lambda)^2 \quad [2.3]$$

$$f_d = (\tfrac{1}{2}K)(\bar{\lambda} + \Delta\lambda)^2 \quad [2.4]$$

These functions (actually $f_u$ and $-f_d$) are plotted in FIG. 2 along with $f_n$ vs. $\Delta\lambda$. As can be seen from these curves, when $\Delta\lambda = 0$, $f_n$ is 0, when $f_u$ is 0, the value of the net force $f_n$ equals $-f_d$. When these points are connected together, it can be seen that the plot of $f_n$ is a linear relationship, despite the fact that the force each electromagnet is producing is non-linear. The fact that a linear relationship exists between the net force $f_n$ and $\Delta\lambda$ can be mathematically proven as well and yields the relationship $$f_n = (2/K)4\Delta\lambda \quad [3]$$

As such, in order to achieve linearization, a control system is needed to control the flux linkages $\lambda$ of the upper and lower electromagnets. A flux linkage control system 10 which is suitable for this purpose is shown in FIG. 3 and is based upon the fact that the flux linkage equals the product of the current, i, and the self-inductance of the coil, L, and that the self-inductance of the coil is equal to K divided by the air gap x, i.e., that $$\lambda = L\,i = (K/x)i \quad [4]$$

More specifically, the coil current i and the air gap x can be easily measured and used to calculate the flux linkages $\lambda$ via the divider 11. Furthermore, since each electromagnet 3, 5 is driven by a voltage source with a voltage e and the integral of voltage is the flux linkage, the flux linkage divided by the inductance yields the current i. These operations are represented inside of box 13 and are carried out by the electromagnet itself. The calculated flux linkages $\lambda$ are subtracted from the reference value $\lambda^*$ to produce a flux linkage error ($\lambda^* - \lambda$) which is amplified by the gain $\Omega$ of error amplifier 12 to yield the coil reactive voltage, e.

The coil resistance is not significant and need not be taken into consideration. However, if desired, in order to compensate for coil resistance, the iR drop can be calculated and added to the voltage applied to the coil.

The transfer function of the flux linkage controller is $$(\lambda/\lambda^*) = \Omega/(S+\Omega) \quad [5]$$

The bandwidth is the gain $\Omega$ which, at least in principle, can be made as large as desired, and S is the Laplace transform integral variable.

Figure 4:
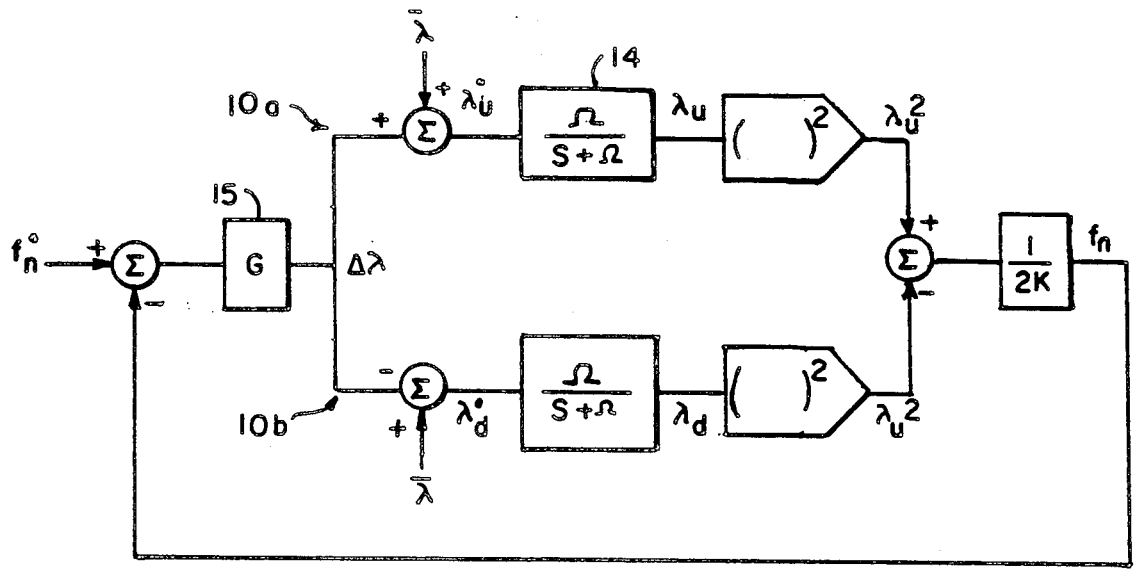
FIGS. 4 and 5 are schematic block diagrams of a force control system for the actuator of FIG. 1.

The control system of FIG. 3 is applied to each of the upper and lower magnets 3, 5 with the upper electromagnet being driven by the signal $\lambda - \Delta\lambda$, as the lower electromagnet being driven by $\lambda - \Delta\lambda$, as depicted in FIG. 4, where 10a and 10b are the FIG. 3 flux linkage control systems of the upper and lower magnets, and where block 14 containing the transfer function $\Omega/(S+\Omega)$ incorporates components 11-13 of FIG. 3. The output of the flux linkage controllers 10a and 10b are $\lambda_u$ and $\lambda_d$. The signals $\lambda_u$ and $\lambda_d$ are squared and the net force $f_n$ calculated in accordance with equation [2]. This calculated value of the net force $f_n$ is subtracted from the reference force $f_n^*$ to produce a force error which is then multiplied by the amplifier gain G of force error amplifier 15 to yield the $\Delta\lambda$ signal.

Figure 5:
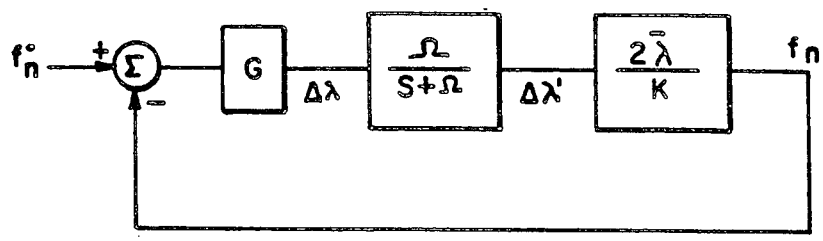

However, from determining the transfer function of the force control system and recognizing that the net force responds to the variation of the flux linkage with respect to time without any dynamic effects or non-linearity, the force control system of FIG. 4 can be represented by the block diagram shown in FIG. 5. Also, it can then be determined that the force control has a simple time delay with a time constant T that can be represented as follows:

$$T = K/(\Omega G 2\bar{\lambda}) \quad [6]$$

The manner in which the voltage and current requirements of the power amplifier are utilized to drive the variable reluctance actuator depends on the actual design and by adjusting the number of coil turns N, any voltage and current desired can be achieved subject to the design constraint reflected by the relationship $$EI = Fwx_m \quad [7]$$

where E is the maximum value of the voltage induced in the electromagnet coil, I is the maximum value of the respective current $i_u$, $i_d$; $x_m$ is the maximum value of the air gap $x_u$, $x_d$, and where values for the F and w are obtained from the equation for the force $f_n$ where the net force to be produced for offsetting the vibration is $$f_n = F\cos(wt + \phi) \quad [8]$$

Thus, it can be seen how the actuator of FIG. 1 can function in a linear bidirectional manner by equipping each electromagnet with a flux linkage control system 10 which slaves the flux linkages to a reference signal and drives its respective electromagnet coil with a controlled voltage source. The flux linkage control systems are incorporated into a force control system which changes the flux linkages $\lambda$ in the electromagnet coils so as to produce a linear relationship between the net force $f_n$ on the armature structure and a reference force $f_n^*$. The net actuator force will not vary with the armature position or armature velocity.

The manner in which the above described bidirectional, variable-reluctance force actuator can be utilized to control structure borne noise and vibration will now be described with reference to a variety of examples of different types of vibration control situations involving vibration resulting from rotary equipment, such as turbine generator sets, pumps, compressors, and the like.

Common to all of the applications to be described is the fact that, in all instances, a reaction mass is suspended, i.e., floated or levitated, in space in a frictionless manner and a force source, such as the above described variable reluctance actuators, are arranged to act between the reaction mass and the vibrating structure.

By the means to be described, the actuators are utilized to reduce the translational and angular vibration of the structure to zero at a particular point, thereby blocking vibration transmission through the structure. Additionally, this active adaptive vibration cancellation control can also be used to reduce the vibration of an entire structure by applying the disclosed actuators to multiple points on the structure simultaneously. Furthermore, the system of actuators and their control can also be used to provide active damping of a structure simultaneously with the active vibration cancellation to thereby increase the attenuation at the system resonances.

Figure 6:
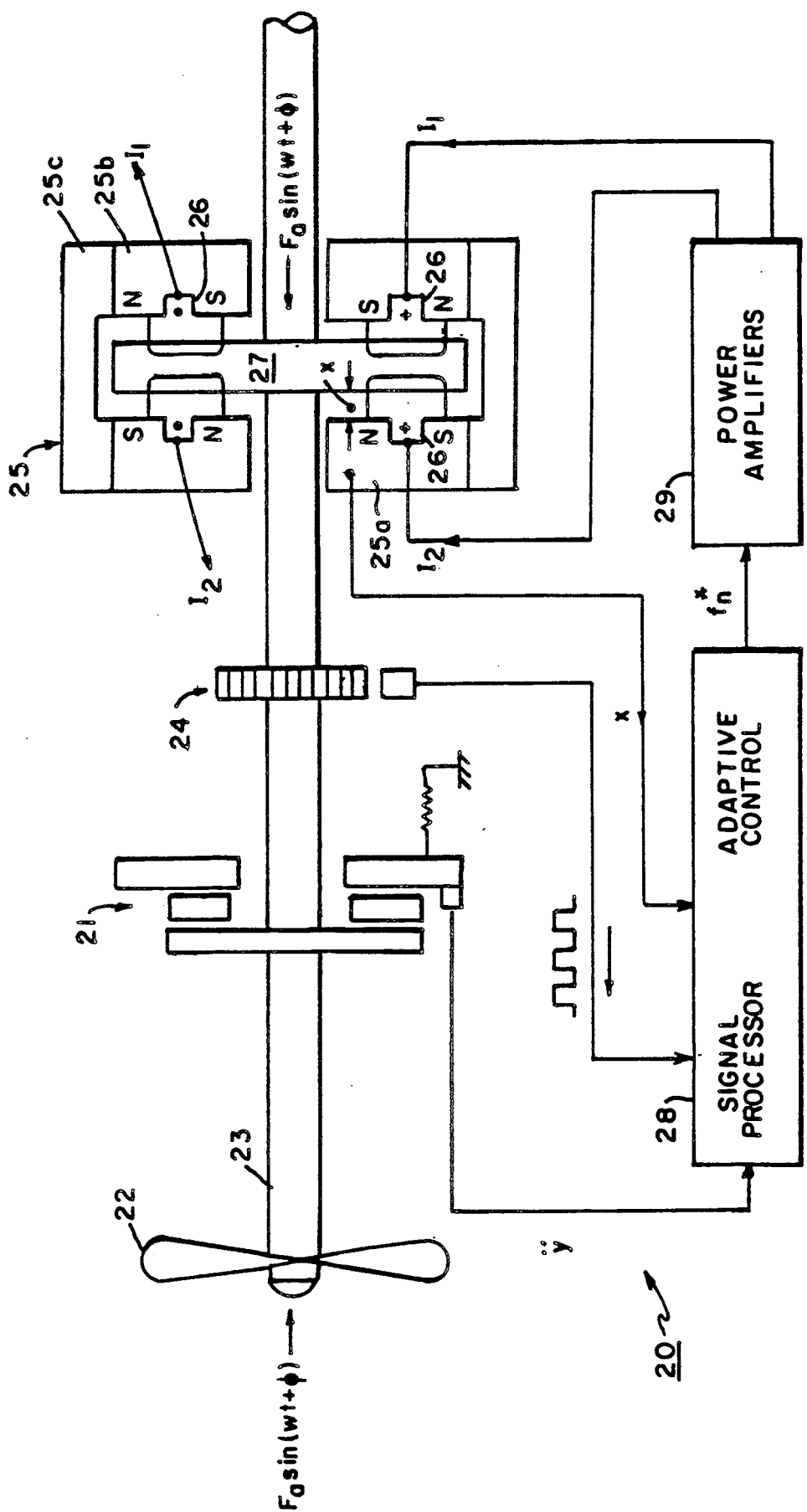
FIG. 6 is a schematic depiction of an active system by which force pulsations are cancelled utilizing actuators of the type shown in FIG. 1.

A first example of an active vibration control system, 20, in accordance with the present invention, represented in FIG. 6, is for canceling propeller induced thrust pulsations on the main drive shaft 23, which are principally resisted by thrust bearing 21 and which result in the hull of the ship being excited to vibratory motion.

System 20 must cancel thrust variations produced by the propeller 22, $F_a \sin(wt + \phi)$. To this end, a force is applied to propeller shaft 23 which is equal and opposite to the thrust pulsation produced by the propeller 22. To apply this force, a variable reluctance force actuator 25 is applied to shaft 23. Furthermore, since the spectrum of these forces changes when the propeller speed is changed, the system must be able to adapt to them.

More specifically, a thrust collar 27 in the form of a disk is rigidly attached to the shaft and functions as the armature of the actuator 25. As described relative to the actuator of FIG. 1, in actuator 25, a common armature works with a pair of electromagnets and, in this case, the pair of magnets 25a, 25b are provided which work in opposite directions with respect to the thrust collar 27 which serves as a common armature of the bidirectional variable reluctance force actuator 25. Each of the electromagnets 25a, 25b takes the form of a right circular cylinder, and has an annular groove 26 which accommodates the excitation winding. A relatively thick-walled cylindrical tube 25c formed of non-magnetic material connects the electromagnets 25a, 25b together into a magnet assembly, and the entire magnet assembly is suspended on the shaft by hydrostatic bearings so that it does not rotate with the shaft. By way of example only, a magnet assembly having a mass of 1000 pounds and outside diameter of about 30 inches with an axial length of 15 inches can be used on a conventional propeller shaft and would require the ability for the magnet mass to travel a distance of ±0.030 inches.

Since the system 20 must cause the force actuator to produce a force equal and opposite to the thrust pulsations to eliminate shaft vibration, some means must be provided to determine what force is to be applied by the force actuator 25. This can be done by considering each harmonic of the thrust pulsations separately and determining how to cancel a single harmonic force component. This can be done by considering that the harmonic has an angular frequency w which is some multiple of shaft speed. As a result of this fact, the pulse train which comes from the pulse tachometer 24 (by appropriate digital signal processing) can be used to generate the functions cos wt and sin wt. The cosine and sine functions, thus, generated can be used to command an actuator force of the form $$a \cos wt + b \sin wt \qquad [9]$$

While this force will have the right frequency, the values of a and b are unknown. On the other hand, since the thrust pulsations are supported by the thrust block, an accelerometer attached to it will produce a signal which contains a sinusoidal component at angular frequency w. As a result, the cos wt and sin wt signals generated by the pulse tachometer 24 can be utilized to carry out on-line Fourier analysis of the acceleration signal to determine the amplitude of the acceleration harmonic frequency w. This enables an optimization routine to null out the acceleration harmonic at frequency w by adjusting a and b in manner equivalent to the manual balancing of an a-c bridge by adjusting two knobs to achieve a null, only it is being done in an automated manner, in this case by a computer signal processor 28 of system 20 which produces the reference value $f_n^*$ and adaptively controls the power amplifier 29 (which incoporates the control circuitry of FIGS. 3 and 4 that controls the current supplied to the actuators 25a, 25b). With this procedure, as many harmonics as desired can be nulled out, and by repeating the process on a cyclic basis, the system is fully capable of adapting to speed changes. Algorithms which can be used to cancel the vibration can be found in the published literature and the use of a specific algorithm forms no part of this invention. However, as an example of a source of a suitable algorithm, reference is made to the publication *The Active Minimization of Harmonic Enclosed Sound Fields*, Journal of Sound & Vibration, Vol. 117, No. 1, pp. 1–13.

Figure 7:
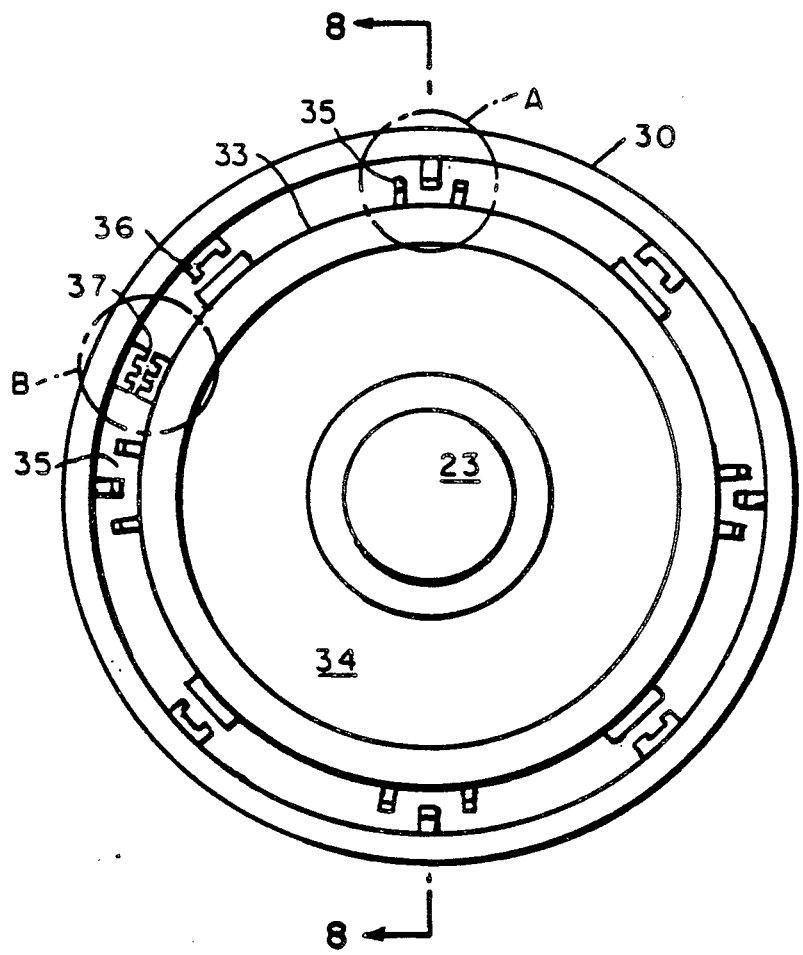
FIG. 7 is an end view of an arrangement for actively controlling torsional and oscillatory vibrations of a rotary shaft using an inertia ring, magnetic bearings, and actuators of the FIG. 1 type.
Figure 8:
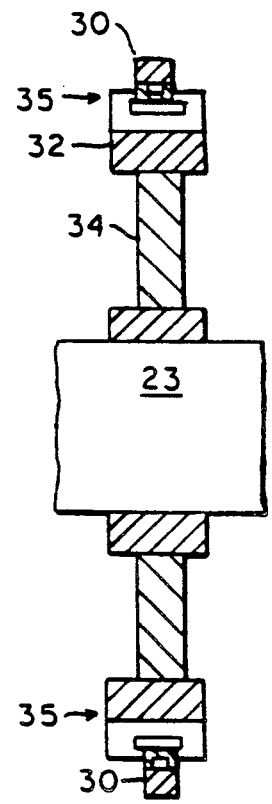
FIG. 8 is a section taken along lines 8—8 in FIG. 7, but with/the rotary shaft shown in partial side elevation.

In order to provide torsional damping or oscillatory torque cancellation, an arrangement as shown in FIGS. 7 and 8 can be provided. In particular, an inertia ring 30 is coupled to the shaft 23 by means of variable reluctance torque actuators and magnetic bearings. Thus, a bearing ring 32 is attached to the shaft 23 by means of a disk 34, which disk could be the end disk of a sound isolation coupling of the type found in an actual propeller shaft installation. The outside of bearing ring 32 is a smooth, cylindrical surface 33, relative to which the inertia ring 32 is floated by means of at least four variable reluctance magnetic actuators 36 that are uniformly spaced about the periphery of bearing ring 32. Actuators 36 are serve as magnetic bearings. Diametrically opposite units work in opposition and provide the exact net force required to counteract the effect of gravity as the disk and inertia ring rotate with the shaft. In addition to radially supporting the inertia ring, these magnetic bearings form thrust bearings that prevent axially displacement of the inertia ring. Magnetic bearings of conventional design can be used as these magnetic actuators 36, or hydrostatic or pneumatic bearings may be used to suspend the inertia ring 30 in a frictionless manner.

Figure 7B:
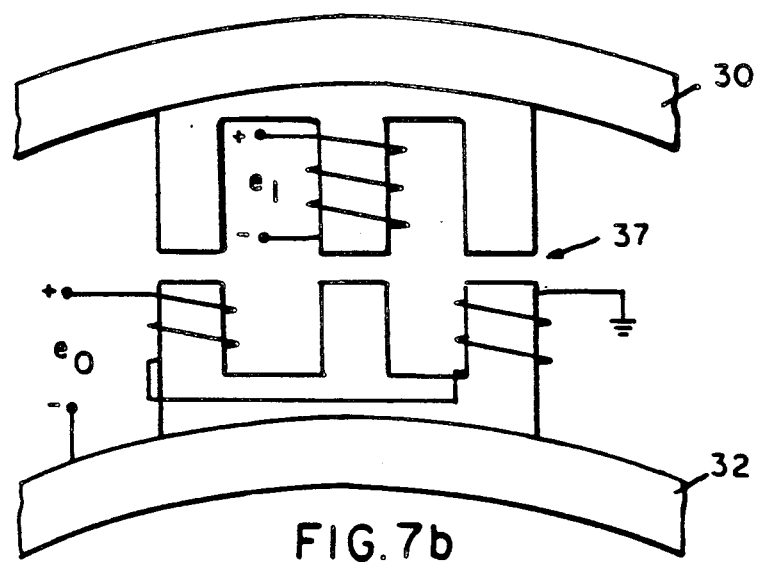
FIGS. 7a and 7b are enlarged views of the encircled details A and B, respectively, in FIG. 7.
Figure 7A:
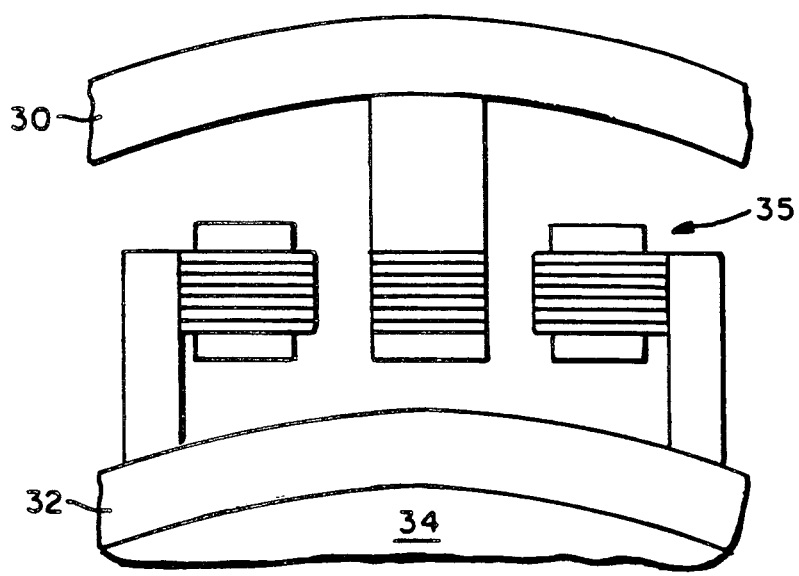

The variable reluctance torque actuators 35 shown in FIGS. 7 and 8, and in greater detail in FIG. 7a, produce a torque vector which is coincident with the axis of the shaft so as to apply a torsional vibration-cancelling torque to the shaft. Furthermore, the torque applied to the shaft is also applied to the inertia ring, thereby superimposing an oscillatory angular velocity on the steady-state angular velocity of the inertia ring.

A low-bandwidth angular position system is provided to control the torque actuators 35 to maintain the average angular position of the inertia ring relative to the disk at a fixed value by acting to maintain the average armature position midway btween the two electomagnetic poles. This causes the inertia ring to rotate with the shaft.

A differential transformer could be used to obtain a position signal. As shown in FIG. 7b, a differential transformer 37 can be disposed between the inertia ring 30 and the bearing ring 32. This transformer is excited with a high frequency voltage $e_1$ at, e.g., 20 KHZ. The voltage $e_0$ will be a suppressed carrier signal whose amplitude will depend on the relative displacement between the two cores (i.e., the angular displacement of the inertia ring). The voltage $e_0$ would be demodulated with the resulting output signal, which will be proportional to the inertia ring displacement angle.

By way of example, it has been determined that a torque pulsation canceller of the type shown in FIGS. 7 and 8 would require an inertia ring mass of about 1000 pounds to cancel blade torque pulsations if the ring diameter is 100 inches and the air gap of the actuators is approximately $\frac{3}{8}''$, although the air gap could be reduced if the ring mass was heavier. Furthermore, since the torque pulsation amplitude is proportional to shaft speed squared, the required gap is constant over the entire speed range.

The means for determining the cancelling torque which is required is the same as that described relative to the active control of longitudinal shaft vibrations of FIG. 6 but, in this case, the accelerometer is mounted to the shaft. Also, by commanding a torque which is proportional to the vibratory disk velocity, torsional damping can be added to the active torque pulsation cancellation.

When a propeller rotates, each blade has a resultant force acting on it which has a time-varying component as well as an average value; however, because of the symmetry of the propeller, the resultant lateral force acting on the propeller tends to be zero. Should this not be exactly the case, some alternating lateral force will be applied to the propeller which is ultimately resisted by the stern tube and other journal bearings on the shaft. In addition, the bull gear on its associated low-speed pinions produce high frequency lateral forces which, to some extent, travel through the sound isolation coupling and excite lateral vibrations of the main shaft.

Figure 9:
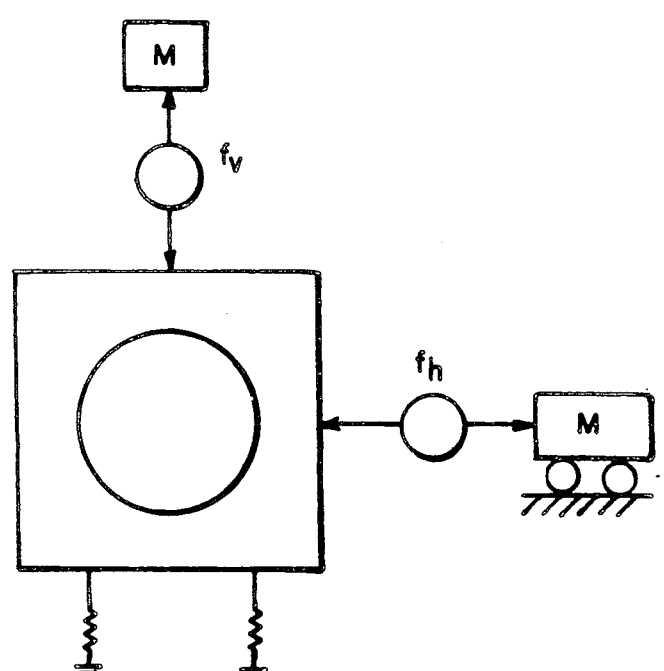
FIG. 9 is a diagrammatic depiction of the principal elements of a system for controlling radial shaft vibration.

In FIG. 9, the principal elements of a system for cancelling out lateral vibration forces is schematically depicted. The horizontal and vertical directions must be considered separately. As a result, a force actuator that produces a force $f_h$ is provided between the bearing housing and a mass M which is supported in a frictionless manner for treating components in a horizontal direction, and a similar arrangement is provided for treating the vertical forces $f_v$. As will be described in greater detail, relative to FIG. 10, a control scheme of the type described above relative to FIG. 6 for cancelling shaft thrust pulsations can be utilized to null out vibratory motion of the bearing housing in both the horizontal and vertical directions.

Figure 10:
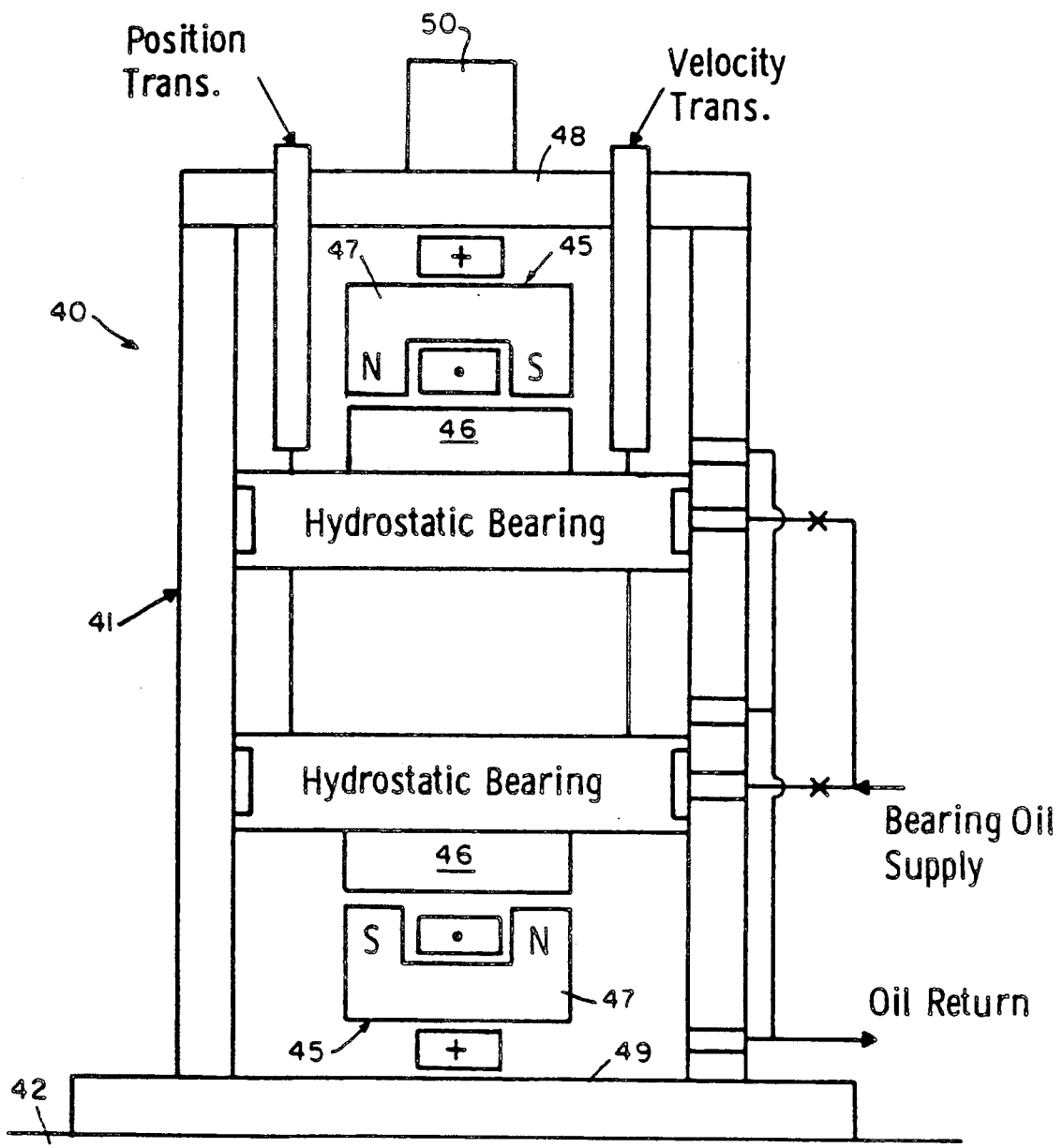
FIG. 10 is a schematic depiction of an embodiment of the FIG. 9 system.

While the mechanical design of the force cancelling apparatus will depend upon the forces and harmonic frequencies involved in the specific apparatus, FIG. 10 represents an embodiment of a force cancelling apparatus for this purpose.

With reference to FIG. 10, it can be seen that cancelling apparatus 40 comprises a mass which is supported by hydrostatic bearings within a cylinder 41 that is mounted to the bearing housing 42. The bearings float the mass on a film of oil and are virtually friction free and can be designed to withstand shock. A pair of variable reluctance force actuators 45 are used which work in opposite directions. The armatures 46 for the actuators are attached to the mass while the electromagnets 47 are attached to the top and bottom plate 48, 49, respectively, of the unit 40. An accelerometer 44 is mounted on top plate 48 and provides a signal for the force-canceling control system. It is noted that while a magnetic suspension system could be used instead of hydrostatic bearings to guide the reaction mass, such is not preferred since it would be more complicated.

In a particular design, it has been found that with a reaction mass of 20 pounds and a travel of $\pm 0.030''$, electromagnets of 6.3 pounds and armatures of 3.9 pounds, the force actuator of FIG. 10 is able to produce $\pm 100$ pounds of force on the mass and, therefore, on the bearing housing.

The associated force control system has a low bandwidth mass-centering system which maintains the average position of the mass in its mid position. The unit is able to operate in any orientation relative to the gravitational direction and the actuators 45 are controlled in accordance with the principles described above.

The active force control unit 40 of FIG. 10 is suitable for a number of other applications including the cancellation of rotor imbalance forces by applying such units to the bearing housings, and the cancellation of main propulsion subbase vibration by mounting a number of such units on the subbase. Furthermore, such units 40 can be mounted directly on a hull or other similar structures to cancel vibratory excitation forces.

As mentioned initially with respect to the cancellation of lateral vibration, and as reflected by FIG. 9, a second unit 40 would be required to cancel force components along a second axis. However, FIGS. 11 and 12 show a two-axis active force unit 50 which can be utilized when vibrations must be simultaneously cancelled in two directions.

Figure 11:
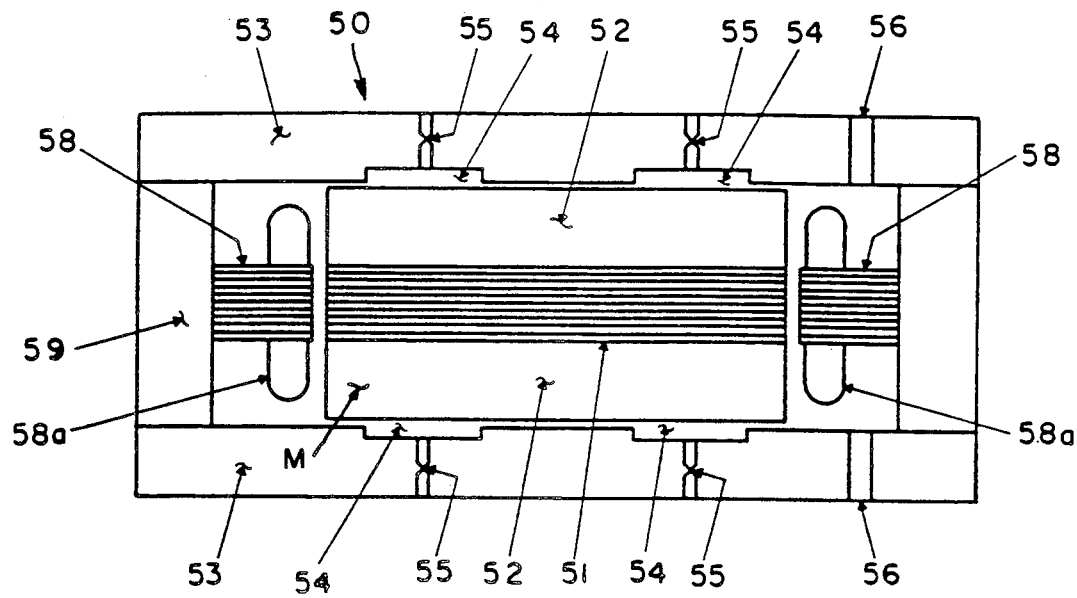
FIGS. 11 and 12 illustrate a two-axis embodiment of a linear bidirectional variable reluctance actuator for use in the FIG. 10 system in top and front views, respectively.
Figure 12:
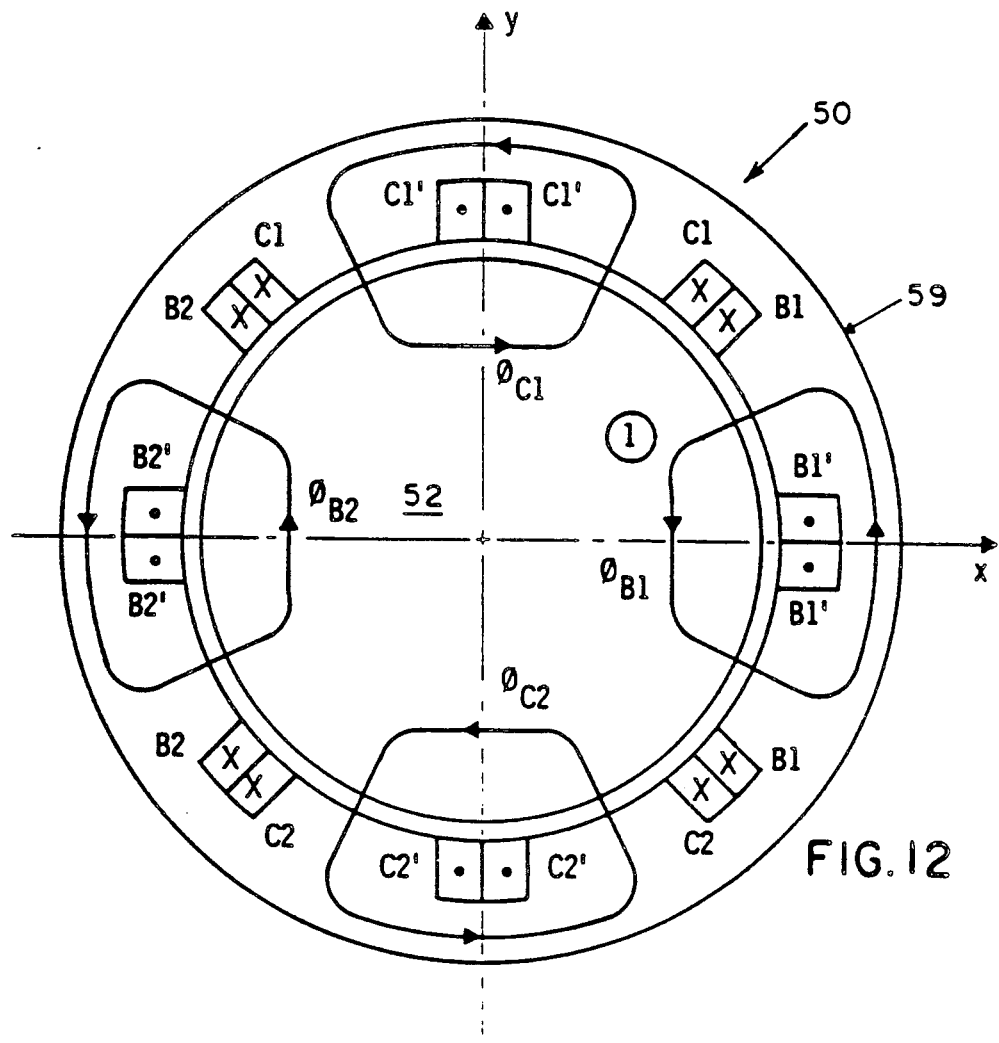

As can be seen from FIG. 11, a cylindrical armature 51 is clamped between cylindrical members 52 and together form reaction mass M. This reaction mass is floated between end members 53 by hydrostatic bearings that are formed by generally circularly shaped pockets 54 (at least three of which are symmetrically disposed about the axis of unit 50) and are fed with oil that flows through metering orifices 55 by a constant pressure hydraulic power supply (not shown). The oil which flows through the metering orifices ultimately flows radially outward through a narrow gap that exists between the members 52 and 53, and then out through drain openings 56. Should the reaction mass move upward, the pressure in the pockets 54 above the reaction mass will increase and that in the pockets 54 below the reaction mass M will decrease, thereby causing a force to be exerted on the mass M in a downward direction due to the changes in the hydraulic resistance associated with the discharge flow path of the hydrostatic bearing pockets. On the other hand, this bearing system is designed so that the reaction mass M is completely free to move in a plane perpendicular to the axis of cylindrical mass M without such motion being resisted by the hydraulic forces.

The electromagnets 58 have a laminated structure similar to the stator of an induction motor. The laminations of electromagnet 58 are clamped together and secured inside of the cylindrical housing 59 which is rigidly attached to the end members 53. The electromagnet windings 58a are placed in slots which are uniformly distributed around the periphery of the electromagnets, as shown for the actuator in FIG. 12; for purposes of simplicity, the electromagnet windings are only schematically depicted. In particular, four independent windings designated B1, B2, C1, and C2, are represented in FIG. 12.

The windings B1 and B2 produce a force along the x axis which may be either positive or negative, while windings C1 and C2 produce a corresponding bidirectional force along the Y axis. Current in the B1 winding produces flux $\phi_{B1}$, and current in the B2 winding produces a flux $\phi_{B2}$. As should be apparent, the flux $\phi_{B1}$ will pull the armature in the +x direction and the flux $\phi_{B2}$ will pull the armature in the −x direction. Thus, by properly controlling the strength of the fluxes $\phi_{B1}$ and $\phi_{B2}$, be produced in either the +x or −x direction. Similarly, force in the +y and −y direction are controllable by regulation of the fluxes $\phi_{C1}$ and $\phi_{C2}$. Control of these fluxes is achieved in the manner described above relative to the bidirectional variable reluctance actuators 1.

Figure 13:
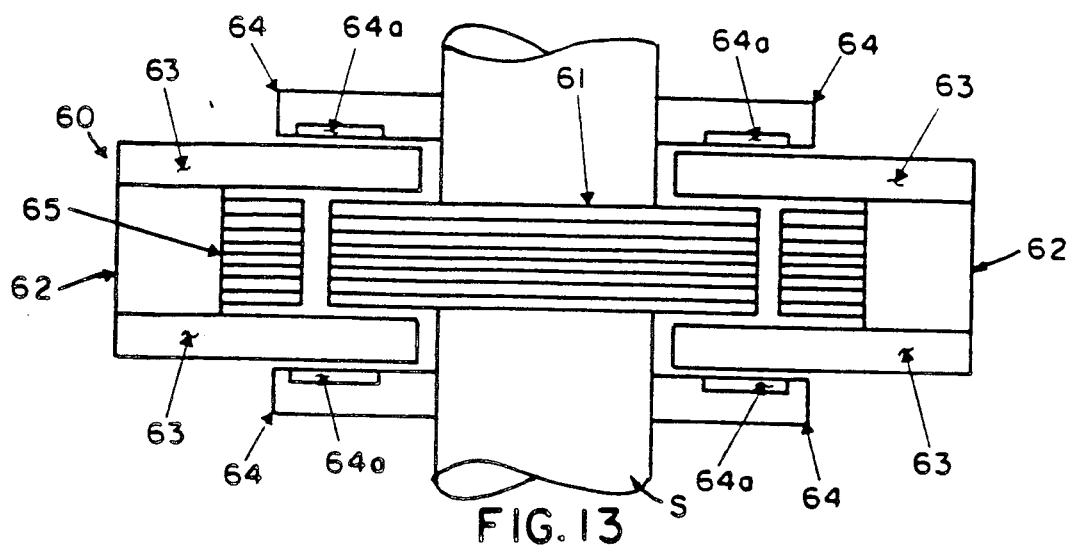
FIG. 13 is a view similar to FIG. 11, but showing the actuator in use with respect to a rotary shaft.
Figure 14:
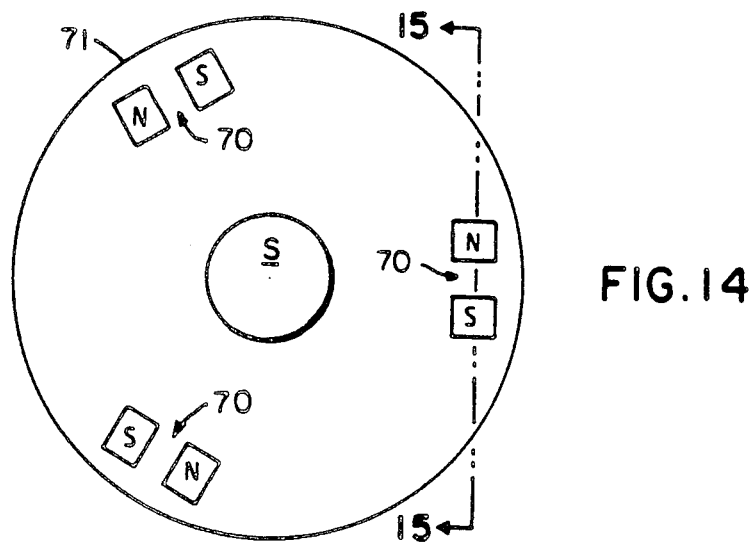
FIGS. 14 and 15 are top and sectional views, respectively, (FIG. 15 being taken along line 15—15 of FIG. 14) of a magnetic alternative to the hydrostatic bearings used for floating the reaction mass in the FIG. 10 system.

While, in FIG. 11, element 58 is the electromagnet and element 51 is the armature, as reflected in the embodiment of FIGS. 13 and 14, it may be desirable to reverse this arrangement so that the reaction mass is on the outside and the base (the part attached to the structure) is on the inside. Such a unit is particularly useful when the forces are desired to be applied perpendicularly to the axis of a cylindrical-type structure, such as shaft S in FIG. 13.

In FIG. 13, a stack of lamination disks 61 are mounted on shaft S for forming either the electromagnet or the armature of the actuator. Furthermore, the reaction mass 60 comprises a hollow right-circular cylinder 62, to the opposite ends of which a pair of cylindrical disk members 63 are fixed. A lamination disks 65 is attached to the inside of cylinder 62 and forms the armature if laminations 61 form the electromagnet and visa versa. The reaction mass 60 is floated by hydrostatic bearings which determine its axial position. The hydrostatic bearings have hydrostatic bearing pockets 64a which are formed in disks 64 that are attached to the shaft S and are supplied with oil through metering orifices which are not shown in FIG. 13, but which correspond to orifices 55 shown in FIG. 11. However, if the presence of oil is not acceptable, magnetic or pneumatic levitation may be utilized instead.

Figure 15:
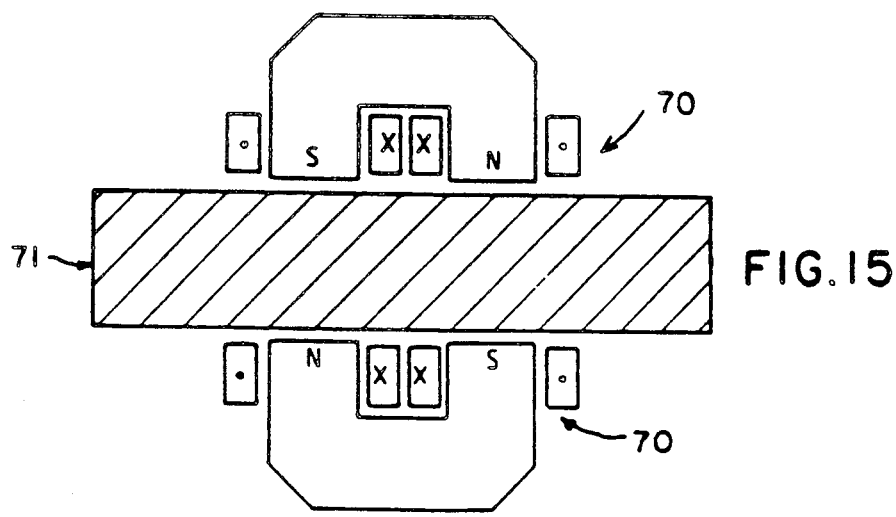

A practical approach for magnetic levitation is depicted in FIGS. 14 and 15. As shown in FIG. 14, three electromagnetic actuators 70 are equiangularly spaced around reaction mass 71, and are disposed on both sides of the reaction mass, as apparent from FIG. 15. Thus, three of the actuators 70 pull in one direction and the other three of the actuators 70 pull in an opposite direction, e.g., up and down, respectively. Furthermore, the line of action of corresponding actuators is coincident and each opposing actuator pair forms a bidirectional force source which maintains the position of the reaction mass midway between the electromagnets by being controlled in the manner described relative to the bidirectional variable reluctance actuator 1. In this regard, it is noted that the armatures for the electromagnets may be built into the reaction mass 71, or they can be mounted to it in any of the manners described above.

Figure 16:
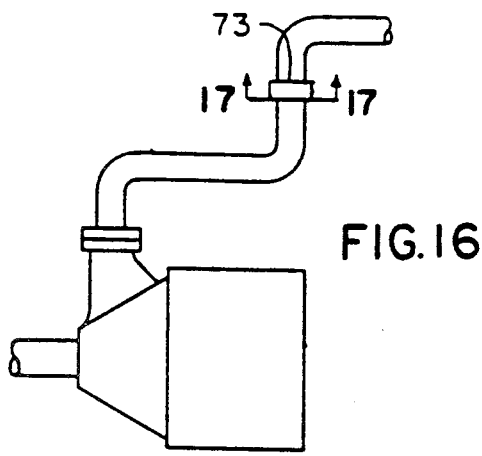
FIG. 16 is a schematic depiction of a steam turbine with a steam supply pipe carrying an active pipe vibration attenuator in accordance with the present invention.

While the systems described, so far, for utilizing bidirectional variable reluctance acuators in accordance with the present invention for purposes of controlling structure borne noise and vibration have primarily been directed toward rotary shaft applications, it should be appreciated that they can be applied to systems for active vibration control of a much more complicated nature. For example, as diagrammatically represented in FIG. 16, a steam turbine on a main propulsion gear unit is supplied with high pressure steam via, for example, a 10-inch diameter pipe. This pipe can reduce effectiveness of the resilient mounts supporting the propulsion machinery due to the fact that it forms a flanking path for vibration of the turbine itself. In accordance with the present invention, to block vibratory transmission along such a pipe, a vibration control unit 73 of actuators in accordance with the present invention can be utilized to apply suitable forces and moments to a section of the steam pipe so as to cause the pipe at a given cross section to stand still.

Figure 17:
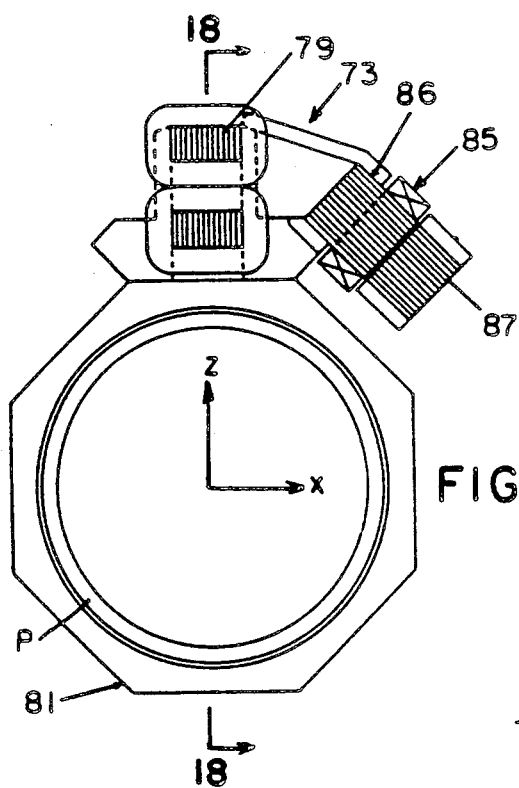
FIG. 17 is a sectional view taken along line 17—17 of FIG. 16 showing an active pipe vibration attenuator on the steam pipe.
Figure 18:
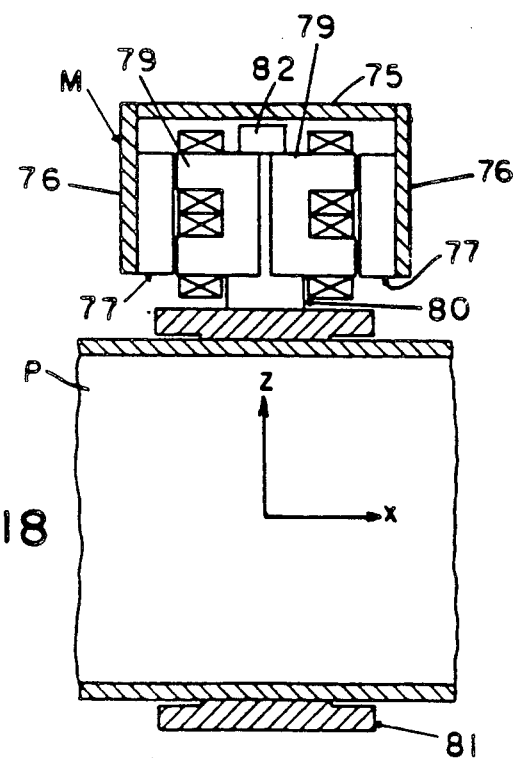
FIG. 18 is a sectional view taken along line 18—18 of FIG. 17.

To accomplish the objective of causing a given cross section of the pipe to stand still, appropriate forces must be applied in all three coordinate directions together with moments along the three coordinate axes (the x and z axes being marked in FIG. 17 and the y and z axes in FIG. 18). These forces can be applied between the pipe P and the reaction mass M which, as illustrated in FIG. 18, can take the form of a hollow right-circular cylinder 75 having axial end plates 76. This reaction mass M is suspended around the pipe P by means of a suspension system 82 which may be similar to the hydrostatic bearing of FIG. 11, or to the magnetic bearing suspending the inertia ring of the embodiment of FIGS. 7,8, and which should have a resonant frequency in all modes which is about 20% of the lowest frequency of vibration to be cancelled. Appropriate armatures of variable reluctance actuators (which form force sources) are attached to the reaction mass M, axial actuator armatures 77 being shown attached to the inside of end plate 76 in FIG. 18. The corresponding electromagnets 79 are connected to the outside of the pipe P via a structural member, such as magnet support 80 mounted upon a pipe clamp ring 81.

Four axial actuators 79 serve as force sources for producing forces in the Y direction. While only one such actuator 79 is shown in FIG. 18, three additional pairs of axial force actuators 79 serve to produce a bidirectional force at 90°, 180°, and 270° relative to the axial bidirectional actuator pair formed by armatures 77 and magnets 79. If the Y directed bidirectional forces produced by these actuators are designated $f_y(1)$, $f_y(2)$, $f_y(3)$, and $f_y(4)$ (see, FIG. 18a), then the Y-direction force is:

$$F_y = f_y(1) + f_y(2) + f_y(3) + f_y(4) \qquad [11]$$

Figure 18A:
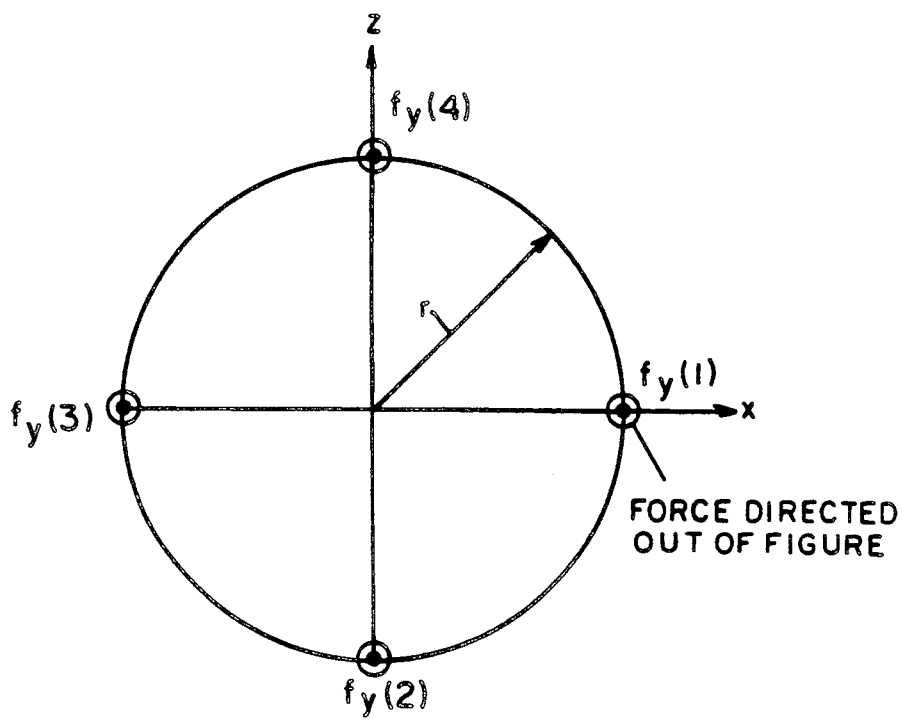
FIGS. 18a and 18b are force diagrams depicting the forces applied by the actuators of vibration attenuator of FIGS. 16-18.
Figure 18B:
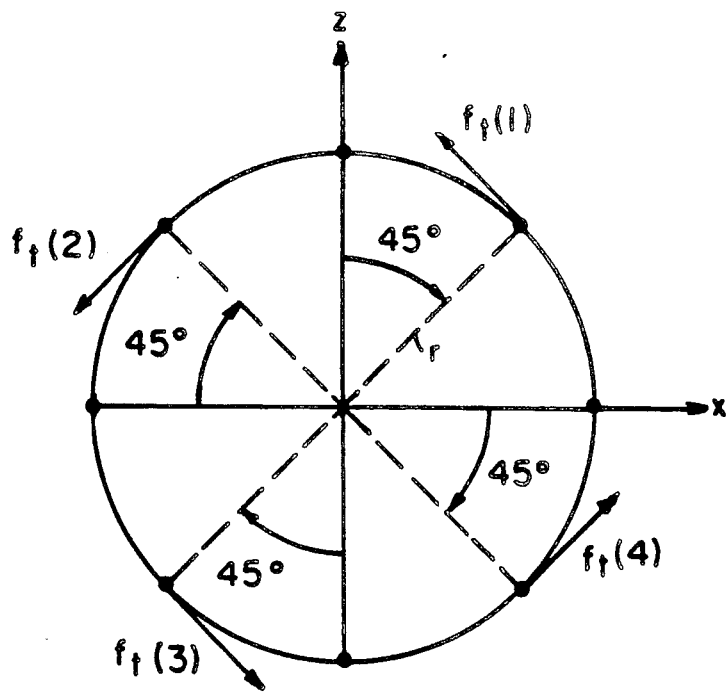

The torque in the x direction is:

$$M_x = r[f_y(4) - f_y(2)] \qquad [12]$$

and the torque in the z direction is:

$$M_z = r[f_y(3) - f_y(1)] \qquad [13]$$

with r being the radius of the line of action of the actuators shown in FIGS. 18a, 18b. Thus, by solving equations [11] through [13] for the $f_y$ forces, a single infinity of solutions results of which the following show the forces required to obtain given values of $F_y$, $M_z$, and $M_x$:

$$f_y(1) = (F_y/4) - (M_z/2r) \quad [14]$$
$$f_y(2) = (F_y/4) - (M_x/2r)$$
$$f_y(3) = (F_y/4) + (M_z/2r)$$
$$f_y(4) = (F_y/4) + (M_x/2r)$$

As can be seen from FIG. 17, a pair of tangential actuators 85, each of which has a pair of tangential actuator magnets 86 and a tangential actuator armature 87 are attached to the pipe clamp ring 81 at 90° intervals along with the axial actuators. These actuators 86 apply tangential forces, $f_t(1)$, $f_t(2)$, $f_t(3)$, and $f_t(4)$ (see, FIG. 18b) and these forces can be used to produce a moment on the pipe int he y direction and the forces in the x and z direction. Considerations similar to those which yield equations [14] can be utilized to yield the following equations:

$$f_t(1) = (M_y/4r) + \sqrt{2}\,(F_z/4) - \sqrt{2}\,(F_x/4) \quad [15]$$

$$f_t(2) = (M_y/4r) - \sqrt{2}\,(F_z/4) - \sqrt{2}\,(F_x/4)$$

$$f_t(3) = (M_y/4r) - \sqrt{2}\,(F_z/4) + \sqrt{2}\,(F_x/4)$$

$$f_t(4) = (M_y/4r) + \sqrt{2}\,(F_z/4) + \sqrt{2}\,(F_x/4)$$

Figure 19:
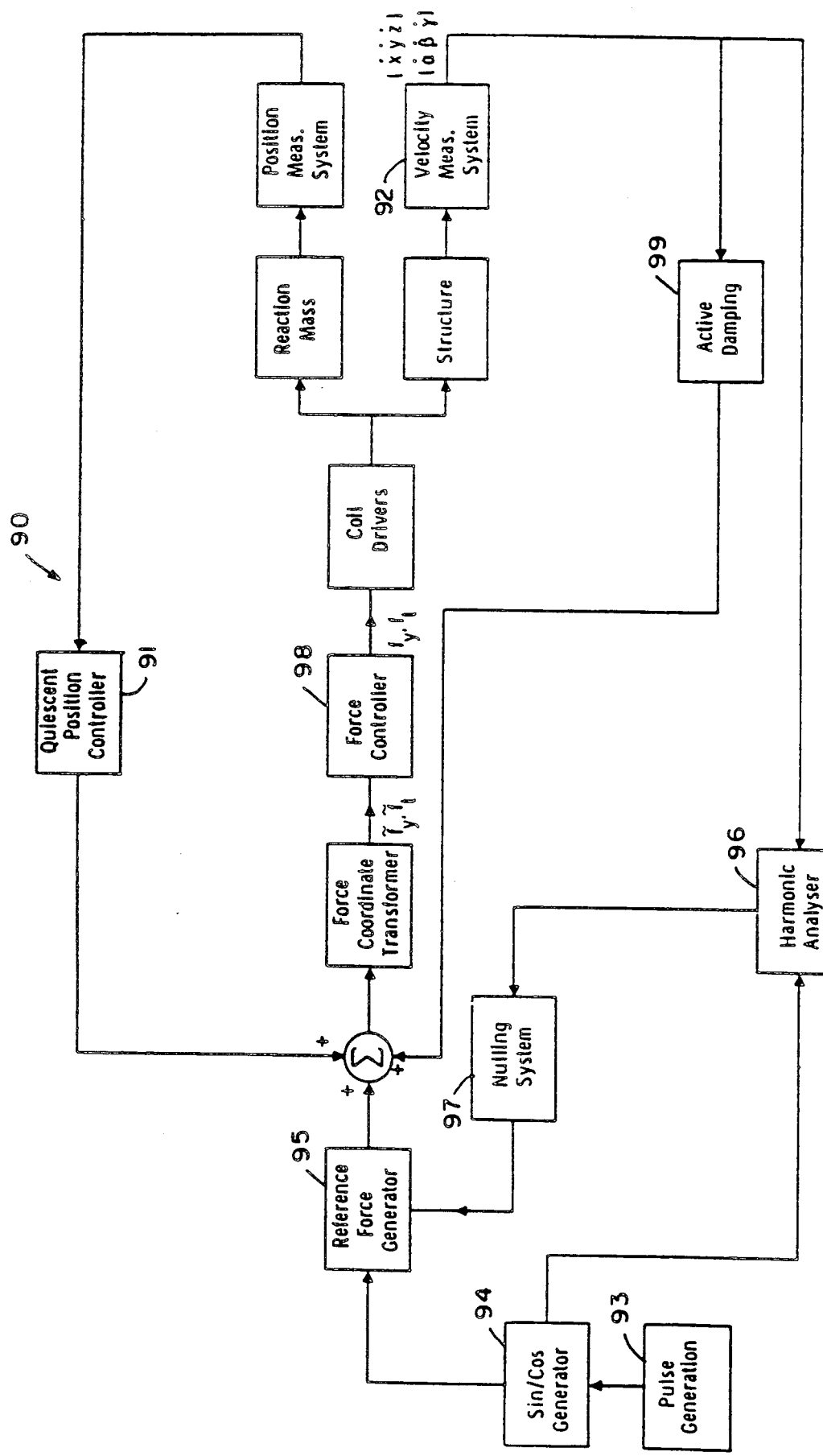
FIG. 19 is a general block diagram of an active vibration attenuator system for pipe vibration attenuation.

As a result, from the foregoing, it can be seen that the 8 bidirectional force actuators arranged as shown and described relative to FIG. 17 and 18 enable all possible forces and moments to be applied to the pipe section P and to the reaction mass M, under the action of an appropriate control system 90 (FIG. 19).

The first requirement for a control system for the vibration attenuation arrangement of FIGS. 17 and 18 is for it to be able to levitate the reaction mass. If in these figures gravity is acting in the minus z direction, the only force required to levitate the mass is $F_z = -mg$, where $F_z$ is the force acting on the pipe and m is the mass of the reaction mass M. However, such a force would be insufficient because the mass M will not be stable because it could translate or rotate since there are no restoring forces or torques.

Therefore, a position control system must be provided which will produce a restoring force proportional to the translation in any of the three coordinate directions x, y and z, as well as a restoring torque to counteract rotation about any of the three axes. For this purpose, six position control systems are required, three translational and three angular. Position errors can be determined from proximity transducers which measure the position of the reaction mass relative to the pipe. Furthermore, each system is provided with a proportional control to provide stiffness, rate control to provide damping, and integral control to provide zero steady-state error. The bandwidth of the position control must be kept very low, e.g., 1 Hz, to permit free motion of the reaction mass within the vibratory frequency range of interest.

The vibratory motion of the pipe has six components which can be deduced by a linear combination of acceleration signals. By integrating the acceleration signals, the three linear velocity components and the angular velocity components can be found. For each velocity component, a corresponding force or torque that will reduce that component to zero is then determined in a manner similar to that described above for longitudinal shaft vibration control. In this manner, the pipe can be made to stand still at the location at which the vibration attenuator is mounted with the reaction mass vibrating in response to the forces applied to make the pipe stand still.

The feasibility of this concept has been established by analysis for a full scale installation in which a 10" diameter steam pipe carried an active pipe vibration attenuator with a reaction mass of 320 pounds and force sources capable of producing plus or minus 288 pounds with a travel of plus or minus 40 mils. In such a case, the electromagnets for both the tangential and axial actuators would be attached to the pipe clamp ring and the armatures formed as an integral part of the reaction mass. To control the four pairs of axial force actuators and four pairs of tangential force actuators, eight axial and tangential accelerometers would be mounted on the pipe clamp ring and eight proximity transducers provided for measuring the relative axial and tangential displacements between the pipe and the reaction mass comprised of the outer ring, end plates and armatures.

In essence, the pipe vibration attenuator represents the most general system since it involves all six degrees of freedom of the reaction mass and the pipe, relative to which the preceding described examples can be considered special cases of the pipe vibration attenuator which have fewer degrees of freedom. A general block diagram for all of the systems and all of the features for cancelling discrete vibration frequencies, including blade rate, turbine rotational, low-speed mesh, and their harmonics can be seen in FIG. 19.

In all cases there is a reaction mass, which may have as many as six degrees of freedom. The reaction mass is generally levitated or floated in free space by a magnetic suspension, but in some cases, as has already been mentioned, it may be floated by a hydrostatic or pneumatic bearing system. The forces between the structure to be silenced and the reaction mass are generated, in each case, by bidirectional variable reluctance force actuators in accordance with the present invention which are given the characteristics of force sources by an appropriate force control system. The reaction mass is positioned relative to the structure by means of a low-bandwidth quiescent position controller 91 which prevents the reaction mass from drifting into its mechanical stops while at the same time giving it perfect freedom of motion at the vibration frequencies.

Integrating accelerometers 92 are used to measure the velocity of the structure in as many degrees of freedom as appropriate for the particular physical system. These velocity signals may be used to supply active damping, which may be necessary to stabilize the nulling system at frequencies corresponding to the poles of the structure transfer function (i.e., at the resonant frequencies).

For vibration which is driven at the blade rate frequencies and harmonics thereof, a pulse generator 93 produces pulses which correspond to the rotation angle of the shaft. A pulse tachometer attached to the shaft is a known means for generating such a pulse train. The angular resolution may be increased by using a phase-locked loop with frequency-division in the feedback path. Furthermore, since each pulse represents a known rotational angle of the shaft, a sine-cosine generator 94, which can be formed by a microprocessor, can be utilized to produce the sine and cosine of the shaft angle. The frequency of these sine and cosine functions will vary in proportion to the speed of the shaft and, thus, can be used to adapt the system to changes in speed of the machinery. These sine and cosine functions drive a reference force generator 95 and a harmonic analyzer 96. The output of the reference force generator is in the form $$f_k = \sum_{n=1,2,3} a_{kn} \cos nwt + b_{kn} \sin nwt \quad [16]$$

where $a_{kn}$ and $b_{kn}$ are weighting values, where n corresponds to the various harmonics and the subscript k corresponds to the various vibration velocity signals. The nulling system 97 generates the a's and b's. The harmonic analyzer 96 produces a real time harmonic analysis of each of the vibration velocity signals. This is done by multiplying the vibration signals by the cos nwt and sin nwt signal from the sine/cosine generator 94 and passing the results through low-pass filters. The result is proportional to the Fourier coefficient. This is done for each harmonic of interest.

The function of the nulling system 97 is to reduce all Fourier coefficients to zero by determining the proper weighting coefficients, which are supplied to the reference force generator 95. As already mentioned, this is analagous to balancing an a-c bridge where one has two knobs to turn to null the output of a detector, the weighing coefficient corresponding to the knobs, the detector output corresponding to the harmonic amplitude which is determined by the harmonic analyzer 96, and the balancing being achieved by a computer instead of manual turning of knobs.

FIG. 19 is a more generic depiction of the controls of the preceding embodiments. More specifically, the force controller 98 contains both the force controller of FIG. 4 and the flux linkage controller of FIG. 3, one of these controllers being required for each variable reluctance actuator used to control vibration. The quiescent position controller 91 positions the reaction mass, and is present in all cases, even though not specifically illustrated in FIG. 6. The adaptive control and signal processor 28 of FIG. 6 includes the controls designated 93 through 97 in FIG. 19. On the other hand, the active damping block 99 represents an optional feature, wherreby the damping of a mechanical system is increase by commanding a force to be applied in opposition to (i.e., reduce) the velocity of the vibrational movement.

From the foregoing, it can be seen that the present invention provides a system in which the transmission of vibrations to a structure can be blocked by applying forces and/or moments to the structure so as to cancel its vibratory velocity. The system can utilize magnetic forces, hydrostatic or pneumatic bearings or guide springs to levitate the reaction mass, and force actuators, in the form of the bidirectional variable reluctance force actuators in accordance with the present invention, to apply forces between the structure and the reaction mass. These force actuators serve as force sources that have no significant mechanical impedence. Furthermore, a force reference generator commands forces to be applied to the structure, via the force sources, utilizing an adaptive control system which determines the proper forces that will cancel the vibration of the structure, being synchronized to machine speed, and determining the harmonic amplitude of the vibration in real time, generating sine and cosine harmonic functions, and automatically nulling out each harmonic of the vibration structure. The system in accordance with the present invention is able to cancel up to six degrees of freedom of structure motion and will damp each degree of freedom of structure motion.

Still further, while specific examples of structures to which the actuators and systems of the present invention may be employed for controlling structure borne noise and vibration have been given, it should be recognized that such have been utilized merely for purpose of explaining various manners in which the present invention may be implemented, and is not intended to represent all of the various possible applications for the present invention, such being too numerous to specifically mention, as will be apparent to those of ordinary skill in the art. Thus, the present invention should not be construed as limited to the specific examples described herein and is intended to encompass the full scope of the claims appended hereto.

We claim:

1. Bidirectional variable reluctance actuator comprising a pair of electromagnets physically connected together through a common structural element, at least one armature disposed between the pair of electromagnets, and a force control means for controlling the electromagnetic forces applied to the armature by the electromagnets; wherein the electromagnets are constructed and arranged relative to said armature in a manner causing the electromagnets to act on said armature with oppositely directed forces; and wherein said force control means comprises a flux linkage control means for producing a relationship between a net force produced on said armature by said electromagnets and an applied reference signal which is substantially linear throughout the range of motion of the armature.

2. Bidirectional variable reluctance actuator according to claim 1, wherein said force control means further comprises controlled voltage sources for driving the electromagnets; wherein the flux linkage control means is slaved to said reference signal; and wherein the flux control means controls said voltage sources as a function of the difference between a desired value of said net force represented by said reference signal and an actual value of said net force which is determined by said flux control means.

3. Bidirectional variable reluctance actuator according to claim 2, wherein said force control means is operable for causing said net force to be constant with variations in armature position and velocity relative to the electromagnets.

4. Bidirectional variable reluctance actuator according to claim 3, wherein, for active attenuation of structure borne vibration and noise, one of said at least one armature and said electromagnets is carried by a vibrating structure and the other is carried by a reaction mass.

5. Bidirectional variable reluctance actuator according to claim 4, wherein said vibrating structure is a rotating shaft.

6. Bidirectional variable reluctance actuator according to claim 5, wherein said one of the armature and the electromagnets that is carried by the vibrating structure is carried by an annular disc mounted on said shaft, and said reaction mass is floated relative to said disc.

7. Bidirectional variable reluctance actuator according to claim 3, wherein, for active attenuation of structure borne vibration and noise, the actuator further comprises means for mounting the actuator to a vibrating structure.

8. Bidirectional variable reluctance actuator according to claim 7, wherein said one of the armature and the electromagnets that is carried by vibrating structure is fixedly secured to the means for mounting.

9. Bidirectional variable reluctance actuator according to claim 8, wherein said means for mounting comprises a pipe clamp.

10. Bidirectional variable reluctance actuator according to claim 8, wherein said means for mounting comprises a plate.

11. Bidirectional variable reluctance actuator according to claim 4, further comprising hydrostatic means for floating the reaction mass relative to the vibrating structure.

12. Bidirectional variable reluctance actuator according to claim 4, further comprising electromagnetic means for floating the reaction mass relative to the vibrating structure.

13. Bidirectional variable reluctance actuator according to claim 1, wherein, for active attenuation of structure borne vibration and noise, one of said at least one armature and said electromagnets is carried by a vibrating structure and the other is carried by a reaction mass.

14. Bidirectional variable reluctance actuator according to claim 13, wherein said vibrating structure is a rotating shaft.

15. Bidirectional variable reluctance actuator according to claim 14, wherein said one of the armature and the electromagnets that is carried by the vibrating structure is carried by an annular disc mounted on said shaft, and said reaction mass is floated relative to said disc.

16. Bidirectional variable reluctance actuator according to claim 1, wherein, for active attenuation of structure borne vibration and noise, the actuator further comprises means for mounting the actuator to a vibrating structure.

17. Bidirectional variable reluctance actuator according to claim 16, wherein said one of the armature and the electromagnets that is carried by vibrating structure is fixedly secured to the means for mounting.

18. Bidirectional variable reluctance actuator according to claim 17, wherein said means for mounting comprises a pipe clamp.

19. Bidirectional variable reluctance actuator according to claim 17, wherein said means for mounting comprises a plate.

20. Bidirectional variable reluctance actuator according to claim 13, further comprising hydrostatic means for floating the reaction mass relative to the vibrating structure.

21. Bidirectional variable reluctance actuator according to claim 13, further comprising electromagnetic means for floating the reaction mass relative to the vibrating structure.

22. System for actively controlling structure borne noise and vibration comprising at least one bidirectional variable reluctance actuator acting between a vibrating structure and a reaction mass, and a force control means for controlling the forces applied to said vibrating structure; wherein each said bidirectional variable reluctance actuator comprises a pair of electromagnets physically connected together through a common structural element and at least one armature disposed between the pair of electromagnets, each of the electromagnets being constructed and arranged relative to said armature in a manner causing the electromagnets to act on said armature with oppositely directed forces; and wherein said force control means comprises a flux linkage control means for controlling the electromagnetic forces applied to the armature of each actuator by the electromagnets thereof in a manner producing a relationship between a net force produced on said armature by said electromagnets and an applied reference signal which is substantially linear throughout the range of motion of the armature, and means for producing said reference signal as a function of the vibration experienced by said vibrating structure.

23. System for actively controlling structure borne noise and vibration according to claim 22, wherein said means for producing said vibration signal as a function of the vibration experienced by the vibrating structure includes sensor means for sensing said vibration.

24. System for actively controlling structure borne noise and vibration according to claim 23, wherein said sensor means comprises at least one accelerometer.

25. System for actively controlling structure borne noise and vibration according to claim 24, wherein said vibrating structure is a rotary shaft, and wherein said means for producing further comprises pulse tachometer means for providing a signal representative of shaft rotational speed.

26. System for actively controlling structure borne noise and vibration according to claim 25, wherein, for cancelling thrust vibrations, said accelerometer is connected to a thrust block of a thrust bearing of the rotary shaft; wherein a thrust collar is mounted about said shaft and an annular reaction mass is floated about said thrust collar; wherein one of the armatures and the electromagnets of said actuator is carried by said reaction mass and the other thereof is carried by said thrust collar; and wherein said force control means includes means for carrying out on-line Fourier analysis of an acceleration signal from said accelerometer at a frequency determined by the signal from the tachometer, and adaptive control means for carrying out an optimization routine which acts to null out the thrust vibrations by adjusting the power supplied to the electromagnets.

27. System for actively controlling structure borne noise and vibration according to claim 25, wherein, for torsional damping and oscillatory torque cancellation, said accelerometer is connected to the shaft; wherein a disk is fixedly mounted on the rotary shaft; wherein an annular reaction mass in the form of an inertia ring is floated about said disk and a plurality of said bidirectional variable reluctance actuators are mounted therebetween; wherein the actuator electromagnets are mounted in pairs on one of said disk and said inertia ring, and the armatures are mounted on the other of said disk and said inertia ring, the electromagnets of each pair being arranged to exert oppositely directed forces on a respective armature in a circumferential direction relative to the inertia ring and the rotary shaft; and wherein said force linkage control means includes means for carrying out on-line Fourier analysis of an acceleration signal from said accelerometer at a frequency determined by the signal from the tachometer, and adaptive control means for carrying out an optimization routine which acts to null out the torque vibrations by adjusting the power supplied to the electromagnets.

28. System for actively controlling structure borne noise and vibration according to claim 25, wherein a plurality of said bidirectional variable reluctance actuators are provided for cancelling radial vibrations; wherein said accelerometer is connected to a bearing housing of the rotary shaft; wherein the armatures of the actuators are integrated into an armature ring that is mounted around the rotary shaft for rotation therewith; wherein an annular reaction mass is floated about said armature ring; wherein the electromagnets of said actuators are carried by said reaction mass and are arranged in diametrally opposed pairs which act on the armature ring in radially opposite directions; and wherein said force linkage control means includes means for carrying out on-line Fourier analysis of an acceleration signal from said accelerometer at a frequency determined by the signal from the tachometer, and adaptive control means for carrying out an optimization routine which acts to null out the thrust vibrations by adjusting the power supplied to the electromagnets.

29. System for actively controlling structure borne noise and vibration according to claim 28, wherein, for cancelling thrust vibrations, said accelerometer is connected to a thrust block of a thrust bearing of the rotary shaft; wherein said armature ring comprises a thrust collar mounted about said shaft and an annular reaction mass is floated about said thrust collar; and wherein at least a further pair of electromagnets is disposed on said reaction mass on axially opposite sides of the armature ring.

30. System for actively controlling structure borne noise and vibration according to claim 24, wherein a plurality of said bidirectional variable reluctance actuators are provided for cancelling lateral vibrations at nonrotary vibrating structures, said system further comprising means for mounting one of the armatures and the electromagnets of the actuators to the nonrotary vibrating structure, the other of said armatures and electromagnets being integrated into the reaction mass; wherein said electromagnets are disposed relative to said armatures for producing opposite laterally acting forces on the reaction mass, the reaction mass being floated relative to said means for mounting so as to be freely movable in directions of action of said laterally acting forces; wherein the accelerometer is mounted to said means for mounting; and wherein said force linkage control means includes an adaptive control means for carrying out an optimization routine which acts to null out the torque vibrations by adjusting the power supplied to the electromagnets.

31. System for actively controlling structure borne noise and vibration according to claim 30, wherein said means for floating comprises hydrostatic means for floating the reaction mass.

32. System for actively controlling structure borne noise and vibration according to claim 30, wherein said means for floating comprises electromagnetic means for floating the reaction mass relative to the vibrating structure.

33. System for actively controlling structure borne noise and vibration according to claim 30, wherein said nonrotary vibrating structure is a bearing housing.

34. System for actively controlling structure borne noise and vibration according to claim 22, wherein a plurality of said bidirectional variable reluctance actuators is provided for cancelling vibration in up to six degrees of freedom, said plurality of actuators forming plural actuator units, each of which comprises bidirectional axially acting actuators and bidirectional tangentially acting actuators, said actuator units being uniformly distributed about a cross section of the vibrating structure.

35. System for actively controlling structure borne noise and vibration according to claim 34, wherein means for mounting said actuator units to the vibrating structure is provided, one of the electromagnets and the armatures of each of said axially acting and tangentially acting actuators being rigidly supported on said means for mounting, and the other of said electromagnets and armatures of each of said actuators being incorporated with the reaction mass and suspended in floating relation with respect to the means for mounting.

36. System for actively controlling structure borne noise and vibration according to claim 34, wherein said means for mounting comprises a pipe clamp.

37. System for actively controlling structure borne noise and vibration according to claim 36, wherein said vibrating structure is a steam pipe of a steam turbine and said pipe clamp is mounted about said steam pipe.

38. System for actively controlling structure borne noise and vibration according to claim 34, wherein said flux control system comprises a position measuring system connected to the reaction mass, and a velocity measuring system connected to the vibrating structure.

39. System for actively controlling structure borne noise and vibration according to claim 38, wherein said flux control system further comprises a quiescent position controller connected to the output of said position measuring system, a nulling system, a sine/cosine generator, and a reference force generator means for producing a reference force signal $f_k$ of the form:

$$a_{kn}\cos nwt + b_{kn}\sin nwt$$

where $a_{kn}$ and $b_{kn}$ are weighting coefficients produced by the nulling system, n corresponds to the various harmonics, k corresponds to a velocity output of the velocity measuring system, and cos nwt and sin nwt are functions of an output of a sine/cosine generator; wherein said nulling system receiving signals from a harmonic analyser which is connected to an output of said sine/cosine generator and to an output of said velocity measuring system; and wherein a force controller means for controlling the power delivered to coils of said electromagnets responds to signals from a force coordinate transformer that is controlled by a signal which is a function of the output of said reference force generator means and of said quiescent position controller.

40. System for actively controlling structure borne noise and vibration according to claim 39, wherein an output of said velocity measuring system is connected to an active damping system, and wherein the signal by which the force coordinate controller is controlled is also a function of the output of said active damping system.

41. System for actively controlling structure borne noise and vibration according to claim 22, wherein said flux control system further comprises a quiescent position controller connected to the output of said position measuring system, a nulling system, a sine/cosine generator, and a reference force generator means for producing a reference force signal $f_k$ of the form:

$$a_{kn}\cos nwt + b_{kn}\sin nwt$$

where $a_{kn}$ and $b_{kn}$ are weighting coefficients produced by the nulling system, n corresponds to the various harmonics, k corresponds to a velocity output of the velocity measuring system, and cos nwt and sin nwt are functions of an output of a sine/cosine generator; wherein said nulling system receives signals from a harmonic analyser which is connected to an output of said sine/cosine generator and to an output of said velocity measuring system; and wherein force controller means for controlling the power delivered to coils of said electromagnets responds to signals from a force coordinate transformer that is controlled by a signal which is a function of the output of said reference force generator means and of said quiescent position controller.

42. System for actively controlling structure borne noise and vibration according to claim 41, wherein an output of said velocity measuring system is connected to an active damping system, and wherein the signal by which the force coordinate controller is controlled is also a function of the output of said active damping system.

43. System for actively controlling structure borne noise and vibration according to claim 42, wherein said velocity measuring system comprises sensor means for producing an output signal as a function of the vibration experienced by the vibrating structure.

44. System for actively controlling structure borne noise and vibration according to claim 43, wherein said sensor means comprises at least one accelerometer.

* * * * *